United States Patent [19]

Ueki et al.

[11] Patent Number: 4,704,433

[45] Date of Patent: Nov. 3, 1987

[54] BLOCK COPOLYMER CONTAINING A METHACRYLATE ESTER BLOCK

[75] Inventors: Satoshi Ueki, Saitama; Chihiro Imai, Kanagawa, both of Japan; Tokuo Makishima, deceased, late of Tokyo, Japan, by Nobuko Makishima, legal representative

[73] Assignee: Toa Nenryo Kogyo Kabushiki Kaisha, Tokyo, Japan

[21] Appl. No.: 738,069

[22] Filed: May 24, 1985

[30] Foreign Application Priority Data

May 29, 1984 [JP] Japan .................................. 59-107617

[51] Int. Cl.$^4$ ............................................. C08F 295/00
[52] U.S. Cl. .................................... 525/242; 525/268; 525/299; 525/309
[58] Field of Search ................. 525/299, 309, 268, 242

[56] References Cited

U.S. PATENT DOCUMENTS

| | | | |
|---|---|---|---|
| 3,497,573 | 2/1970 | Hostetler | 525/385 |
| 4,028,435 | 6/1977 | Seki et al. | 525/309 |
| 4,057,600 | 11/1977 | Kimura et al. | 525/269 |

FOREIGN PATENT DOCUMENTS

| | | | |
|---|---|---|---|
| 2656231 | 6/1977 | Fed. Rep. of Germany | 525/299 |
| 1178340 | 1/1970 | United Kingdom | 525/299 |

OTHER PUBLICATIONS

Yoshiharu Doi, Satoshi Ueki, and Tominaga Keii, "Preparation of "Living" Polypropylenes by a Soluble Vanadium-based Zeigler Catalyst," *Makromol. Chem.*, 180, pp. 1359–1361 (1979).

Yoshiharu Doi, Satoshi Ueki, and Tominaga Keii, "Living" Coordination Polymerization of Propene Initiated by the Soluble V(acac)$_3$–Al(C$_2$H$_5$)$_2$Cl System," *Macromolecules*, 12, pp. 814–819 (1979).

*Primary Examiner*—Wilbert J. Briggs, Sr.
*Attorney, Agent, or Firm*—S. H. Markowitz; J. B. Murray, Jr.

[57] ABSTRACT

A novel block copolymer is disclosed which includes a random ethylene-propylene copolymer segment (A) and a methacrylate segment (B). The block copolymer has a number-average molecular weight of about 1,000 to about 600,000 and a ratio of (A) to (B) of 15/85 to 97/3 by weight.

6 Claims, 2 Drawing Figures

ELUTION TIME (MINUTES)

BLOCK COPOLYMER CONTAINING A METHACRYLATE ESTER BLOCK

BACKGROUND OF THE INVENTION

The present invention relates to a new block copolymer. More particularly, it relates to a block copolymer in which an ethylene-propylene copolymer is bonded to a polymethacrylate ester.

The living polymerization is useful for the production of monodisperse polymers and block copolymers of uniform composition, and many attempts have been made for the production of olefin block copolymers by living polymerization also in the area of coordinate polymerization that employs a Ziegler-Natta catalyst. However, it is difficult to produce block copolymers of uniform composition by living polymerization because chain transfer reactions and termination reactions take place frequently during living polymerization.

The present inventors found that a catalyst composed of V(acetylacetonate)$_3$ and Al(C$_2$H$_5$)$_2$Cl provides nearly monodisperse living polypropylene. [Makromol. Chem., 180, 1359 (1979); and Makromolecules., 12, 814 (1979)] The present inventors also found that this technology can be applied to the living copolymerization of ethylene and propylene. According to this technology, it is possible to produce a nearly monodisperse random living copolymer of ethylene and propylene. If this copolymer is copolymerized with methacrylate ester, there is obtained a block copolymer of uniform composition which is composed of the segments of nearly monodisperse ethylene-propylene random copolymer and the segments of nearly monodisperse polymethacrylate ester. The present invention was completed based on this finding.

The gist of this invention resides in a block copolymer having a number-average molecular weight of about 1,000 to about 600,000 in which the random copolymer segment (A) is bonded to the polymer segment (B), with the ratio of (A) to (B) being 15/85 to 97/3 by weight, said random copolymer segment (A) being composed of the constitutional units represented by the formulas I and II below.

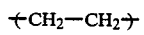    I.

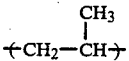    II.

[the amount of I being 30 to 80 wt% and the amount of II being 70 to 20 wt%], said polymer segment (B) being composed of the constitutional units, represented by the formula below.

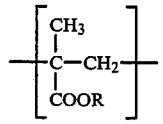

(where R denotes a hydrocarbon group.)

Said block copolymer is produced by either of the following processes. (Process I) At first, the living polymerization of ethylene and propylene is performed in the presence of β-diketone vanadium chelate and an organoaluminum compound to give a living ethylene-propylene random copolymer. Then, a methacrylate ester is polymerized in the presence of the living copolymer. (Process II) The living ethylene-propylene random copolymer is brought into contact with a halogen to halogenate the terminals of the copolymer. The halogenated copolymer is then brought into contact with metallic magnesium, and the resulting product is finally brought into contact with a methacrylate ester to perform living polymerization.

The living ethylene-propylene random copolymer is produced by copolymerizing ethylene and propylene in the presence of a polymerization catalyst composed of β-diketone vanadium chelate (referred to as vanadium compound hereinafter) and an organoaluminum compound.

The vanadium compound is represented by the formula below.

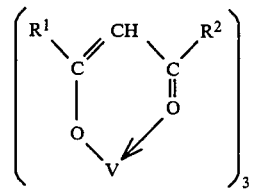

(where R$^1$ and R$^2$ are the same or different alkyl groups or aryl groups.) It includes, for example V(acetylacetonate)$_3$, V(benzoylacetylacetonate)$_3$, and V(dibenzoylmethanate)$_3$.

The organoaluminum compound is represented by the formula R$_2$AlX (where R is an alkyl group or aryl group having 1 to 8 carbon atoms, and X is a halogen atom). It includes, for example, dimethylaluminum chloride, diethylaluminum chloride, diethylaluminum bromide, and diisobutylaluminum chloride.

The polymerization reaction should preferably be performed in a solvent which is inert and liquid at the time of polymerization. Examples of the solvent include saturated aliphatic hydrocarbons such as propane, butane, pentane, hexane, and heptane; saturated alicyclic hydrocarbons such as cyclopropane and cyclohexane; and aromatic hydrocarbons such as benzene, toluene, and xylene.

Ethylene and propylene can be brought into contact with the polymerization catalyst in any manner. Preferably, the contact is accomplished by adding a solution of the organoaluminum compound and then a solution of the vanadium compound to a solvent solution of ethylene and propylene.

The amounts of the polymerization catalyst used for 1 mol of ethylene and propylene are as follows: The amount of vanadium compound is $1 \times 10^{-4}$ to 0.01 mol, preferably $5 \times 10^{-4}$ to $5 \times 10^{-3}$ mol, and the amount of the organoaluminum compound is $1 \times 10^{-3}$ to 0.1 mol, preferably $5 \times 10^{-3}$ to 0.01 mol. Preferably, the organoaluminum compound is used in an amount of 5 to 25 mol for 1 mol of the vanadium compound.

The molecular weight and yields of the living copolymer can be regulated by changing the reaction temperature and reaction time. According to this invention, it is possible to produce a polymer which has a molecular weight distribution similar to that of a monodisperse polymer, if the polymerization temperature is kept low, particularly lower than −50° C. Polymerization at −65° C. or below provides a living ethylene-propylene random copolymer having a molecular weight distribution of 1.05 to 1.40 which is defined by $\overline{M}w/\overline{M}n$ (where $\overline{M}w$ is the weight-average molecular weight and $\overline{M}n$ is the number-average molecular weight).

The polymerization reaction may be accompanied by a reaction accelerator such as anisole, water, oxygen, alcohol (methanol, ethanol, isopropanol, etc.), and ester (ethyl benzoate, ethyl acetate, etc.). The reaction accelerator is used in an amount of 0.1 to 2 mol for 1 mol of the vanadium compound.

The ratio of ethylene to propylene in the living copolymer should be in such a range that the property of the final block copolymer attributable to the ethylene-propylene random copolymer in it is not adversely affected. The ethylene-to-propylene ratio is usually 30/70 to 80/20 by weight.

The composition of the ethylene-propylene random copolymer can be regulated by changing the ratio of ethylene to propylene at the time of living copolymerization. The greater the amount of ethylene used, the broader the molecular weight distribution of the resulting polymer, and this is not preferable. A living copolymer of high ethylene content having a narrow molecular weight distribution (or a nearly monodisperse living copolymer) can be produced by performing living polymerization of a small amount of propylene prior to the living copolymerization of ethylene and propylene. The living copolymer obtained in this way has a narrow molecular weight distribution and yet contains a large amount of ethylene. In actual, propylene alone is supplied at first to the polymerization system so that living polypropylene having a number-average molecular weight of 500 to 2000 is formed. Subsequently, ethylene is supplied to continue living polymerization in the presence of a large amount of unreacted propylene monomer until the random copolymerization of ethylene and propylene is completed.

In the way mentioned above, it is possible to produce a nearly monodisperse living ethylene-propylene random copolymer having a number-average molecular weight of about 500 to about 500,000 (in terms of propylene, to be repeated hereinafter).

In the next step, a methacrylate ester is polymerized in the presence of the random copolymer to give the block copolymer of this invention. (Process I).

The methacrylate ester is represented by the formula below.

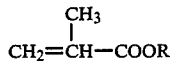

(where R denotes a hydrocarbon group having 1 to 20 carbon atoms.) Preferred examples of R are alkyl groups having 1 to 6 carbon atoms such as methyl, ethyl, n-propyl, n-butyl, n-pentyl, and n-hexyl groups.

The polymerization of methacrylate ester is accomplished by bringing the methacrylate ester into contact with the living ethylene-propylene random copolymer. The polymerization of methacrylate ester is carried out usually at 0° C. to 50° C. The reaction rate is slow at a temperature below −50° C. which is preferable for the living copolymerization of ethylene and propylene. According to the preferred polymerization process, the living copolymerization of ethylene and propylene is carried out for a prescribed period of time, and then the methacrylate ester is added while keeping the polymerization temperature. Finally, the reaction temperature is raised to effect the polymerization of the methacrylate ester.

The molecular weight of the polymethacrylate ester can be regulated by changing the polymerization temperature and polymerization time. If the polymerization temperature is excessively high, the resultant living polymethacrylate ester has a broad molecular weight distribution. Thus the preferred polymerization temperature is 0° C. to 30° C. The molecular weight increases in proportion to the polymerization time until it reaches a certain magnitude which is about 10,000 to about 20,000. Therefore, process I is suitable for the production of living polymethacrylate ester having a number average-molecular weight of about 500 to 5,000.

If it is desirable to increase the molecular weight further, the above-mentioned process II should be used. According to this process, the living ethylene-propylene random copolymer is brought into contact with a halogen, and the resulting product is brought into contact with metallic magnesium and the reaction product is finally brought into contact with a methacrylate ester.

When the living ethylene-propylene random copolymer is brought into contact with a halogen, the copolymerization of ethylene with propylene is suspended immediately. The resulting product is an end-halogenated ethylene-propylene random copolymer having the skeleton of the above-mentioned living ethylene-propylene random copolymer.

The halogen that can be used in that step is iodine, chlorine, or bromine, and it is used in an amount of 2 mol and up, preferably 2 to 5 mol, for 1 mol of the organoaluminum compound used for the production of ethylene-propylene random copolymer. The halogen may be used as such; but it should preferably be used in the form of solution in the same solvent as used for the production of the above-mentioned random copolymer. The concentration of the solution is 0.1 to 5 mol in 1 liter of the solvent. Usually, the halogenation reaction is performed for 5 minutes to 6 hours at −50° to −100° C. Upon addition of an alcohol to the reaction system, the halogenated ethylene-propylene random copolymer separates out.

The halogenated ethylene-propylene random copolymer thus obtained is then brought into contact with metallic magnesium. To achieve the contact, the halogenated copolymer should be dissolved in tetrahydrofuran or diethylether. The contact is carried out at the refluxing temperature of the ether solvent for 1 to 10 hours. The ratio of the halogenated copolymer to the metallic magnesium is usually 1000/1 to 10/1 by weight.

To the reaction solution thus obtained is added a methacrylate ester to effect the living polymerization of the methacrylate ester. Thus there is obtained the block copolymer of this invention. The methacrylate ester is used in an amount more than 10 times (by weight), preferably more than 20 times the amount of the halogenated ethylene-propylene random copolymer. The living polymerization of methacrylate ester should preferably be performed at a low temperature as in the case of living copolymerization of ethylene and propylen. The lower the polymerization temperature, the narrower the molecular weight distribution of the resulting polymer. If the reaction temperature is excessively low, the polymerization rate is slow. Thus the polymerization temperature from −50° C. to −100° C. is recommended.

The molecular weight of the living polymer can be regulated by changing the polymerization time. The longer the polymerization time, the greater the molecular weight. It is also possible to increase the molecular weight by increasing the polymerization temperature; but the polymerization at a high temperature results in a broad molecular weight distribution and consequently is not desirable. Process II provides a living polymethacrylate ester having a much higher molecular weight than process I does. According to process II, it is even possible to produce a living polymethacrylate ester having a number-average molecular weight of about 100,000.

The polymerization of methacrylate ester in process I and process II is suspended when an alcohol is added to the polymerization system, and at the same time the resulting block copolymer separates out. The block copolymer is separated from excess methacrylate ester and then washed with acetone, methanol, or the like, followed by drying, for recovery.

In this way there is obtained an AB-type block copolymer in which the copolymer segment (A) of narrow molecular weight distribution formed by random copolymerization of ethylene and propylene is connected to the polymer segment (B) of narrow molecular weight distribution formed by polymerization of methacrylate ester. The copolymer of this invention usually has a number-average molecular weight of about 1,000 to about 600,000, preferably 3,000 to 200,000, more preferably 5,000 to 100,000. The ratio of segment (A) to segment (B) is 15/85 to 97/3 (by weight).

The molecular weight and composition of the block copolymer can be regulated by changing the molecular weight and composition of the living ethylene-propylene random copolymer and the conditions for polymerization of methacrylate ester.

The block copolymer of this invention is characterized by that it is a nearly monodisperse polymer of uniform composition having a molecular weight distribution ($\overline{Mw}/\overline{Mn}$) of 1.05 to 1.40.

The block copolymer of this invention is composed of nonpolar polymer segments (A) and polar polymer segments (B). Therefore, it differs in properties from the conventional block copolymers and polymer mixtures. It is useful as a dyeing agent, adhesive, polymer modifier, compatibilizing agent, and surface modifier.

The invention is now described in more detail with reference to the following examples, in which the characterization of polymers and copolymwers was carried out in the following way.

Molecular weight and molecular weight distribution: Determined by using GPC (gel permeation chromatography), Model 150, made by Waters Co. under the following conditions.

Solvent: trichlorobenzene.
Temperature: 135° C.
Flow rate of solvent: 1.0 ml/min.
Sample of concentration: 0.15 wt/vol%.
Column: GMH6 made by Toyo Soda Kogyo Co. The calibration curve of polypropylene for determination was prepared according to the universal method from the calibration curve of polystyrene obtaine dby using the standard sample of monodisperse polystyrene available from Waters Co.

Determination of polymer structure ($^{13}$C-NMR spectrum): Performed by using Model XL-200 made by Varian Co., equipped with the PFT pulse Fourier transformer Frequency: 50 MHz.
Temperature: 120° C.
Pulse width: 8.2 $\mu$s $\pi/3$.
Pulse interval: 4 sec.
Number of integration: 5000.
Sample: prepared by dissolving in a 2:1 mixture solvent of trichlorobenzene and heavy benzene.

Infrared absorption spectrum: Determined by using an infrared spectrophotometer, Model A-3, made by Nippon Bunko Kogyo Co., for a 75 $\mu$m thick film made from the copolymer.

EXAMPLE 1

Synthesis of Living Ethylene-Propylene Random Copolymer

Into a 1-liter flask, with the atmosphere therein completely replaced with nitrogen, was placed toluene as a solvent, and the system was cooled to $-78°$ C. While keeping that temperature, 180 g (4.2 mol) of propylene was added. (It became liquefied and dissolved.) Then there were added a toluene solution containing 0.1 mol of Al(C$_2$H$_5$)$_2$Cl, a toluene solution containing 5 mmol of V(acetylacetonate)$_3$, and 2.5 mmol of anisole in the order mentioned. Preliminary polymerization was started at $-78°$ C. One hour after preliminary polymerization, nitrogen was evacuated and 4.6 g (0.16 mol) of ethylene was introduced. Copolymerization of ethylene and propylene was carried out at $-78°$ C. for 5 minutes under an atmosphere of nitrogen. Thus there was obtained a living ethylene-propylene random copolymer. (Ethylene-propylene random copolymer is abbreviated as EPR hereinafter.)

In order to measure the physical properties of the living EPR obtained as mentioned above, the copolymerization of ethylene and propylene was performed in the same way as above. The polymerization reaction liquid was quickly placed in 500 ml of ethanol-HCl solution which had been cooled to $-78°$ C. to cause the polymer to separate out. The polymer was washed five times with 500 ml of ethanol, followed by drying at room temperature. Thus there was obtained 9.1 g of EPR.

The thus obtained EPR was examined for molecular weight and molecular weight distribution. It was found to be a nearly monodisperse polymer having $\overline{Mn}=27,200$ and $\overline{Mw}/\overline{Mn}=1.21$. This polymer gave a GPC elution curve as shown in FIG. 1 (1). The single peak should be noted. The polymer also gave the $^{13}$C-NMR chart as shown in FIG. 2. The content of propylene in this polymer was calculated according to the following equation from the area of the peak (indicated by S) assignable to the secondary carbon atom and the area of the peak (indicated by T) assignable to the tertiary carbon atom.

$$\text{Propylene content (mol \%)} = \frac{T}{\frac{1}{2}(S + T)} \times 100$$

The polymer was found to contain 42 mol% (equivalent to 50 wt%) of propylene. (Incidentally, the peak indicated by P is assignable to the primary carbon atom.)

According to thermal analysis by a differential scanning calorimeter (DSC), EPR was found to have no glass transition point (about $-10°$ C.) assignable to propylene homopolymer.

Synthesis of EPR Block Copolymer

To the above-mentioned living polymerization system was added 40 mmol of methyl methacrylate (abbreviated as MMA hereinafter) at −78° C. The temperature of the system was raised to 25° C. over a period of 1 hour, and the polymerization of MMA was performed at 25° C. Five hours later, the reaction solution was introduced into 500 ml of ethanol to cause the polymer to separate out. The thus obtained polymer was washed five times with 500 ml of methanol, followed by drying at room temperature. Thus there was obtained 10.5 g of copolymer.

The resulting copolymer gave a GPC elution curve having a single peak as shown in FIG. 1 (3). This copolymer was found to have a number-average molecular weight of 29,700 and a molecular weight distribution ($\overline{Mw}/\overline{Mn}$) of 1.17, which is close to that of a monodisperse polymer.

For the purpose of reference, the homopolymerization of MMA was carried out in the following way. At first, there was prepared at −78° C. a catalyst solution composed of V(acetylacetonate)$_3$-Al(C$_2$H$_5$)$_2$Cl, which is the same catalyst as used for the synthesis of living EPR. After the solution of MMA, the temperature of the polymerization system was raised to 25° C. and the polymerization of MMA was performed. The yield of the polymer increases in proportion to the polymerization time for 5 to 6 hours after the start of polymerization. After the lapse of this period, the polymerization stops. The thus obtained polymer gave a GPC elution curve as shown in FIG. 1 (2). It was found to be a nearly monodisperse polymer having $\overline{Mw}/\overline{Mn}=1.1$ to 1.2. (The polymerization of MMA did not proceed at −78° C.) The copolymer obtained as mentioned above gate a GPC elution curve as shown in FIG. 1 (3). It should be noted that there is peak assignable to the homopolymer of MMA. In the meantime, the copolymerization of EPR and MMA was carried out in the same manner as mentioned above, the resulting polymer was extracted with acetic acid. The homopolymer of MMA was not observed. (The homopolymer of MMA is soluble in acetic acid, but EPR is not soluble.)

The copolymer obtained as mentioned above was examined by $^{13}$C-NMR analysis. The chart gave, in addition to the peaks assignable to EPR, several peaks of the following chemical shift values.

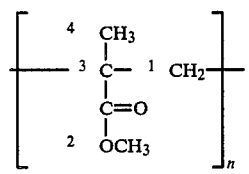

| assignment | Chemical shift (ppm, TMS) |
|---|---|
| 1 | 53.1–55.4 |
| 2 | 51.4 |
| 3 | 45.5–46.4 |
| 4 | mm 22.2 |
|   | mγ 20.0 |
|   | γγ 17.8 |

This result indicates that the copolymer is an AB-type block copolymer composed of the segment (A) which is an ethylene-propylene random copolymer and the segment (B) which is a polymer of MMA. The ratio of segment (A) to segment (B) in the copolymer was 87/13 (by weight).

EXAMPLES 2 AND 3

Two kinds of living EPRs were prepared as in Example 1 under different polymerization conditions. The resulting living EPRs had the physical properties as shown in Table 1. Then the copolymerization of the living EPR with MMA was carried out as in Example 1 under different polymerization conditions. Thus there were obtained AB-type EPR block copolymers, the properties of which are shown in Table 1.

EXAMPLE 4

A living EPR having the properties as shown in Table 1 was prepared as in Example 1 under different conditions. The living EPR was copolymerized with n-butyl methacrylate as in Example 1 under the polymerization conditions as shown in Table 1. The resulting copolymer was found to have the molecular weight and molecular weight distribution as shown in Table 1. The infrared absorption spectrum of the copolymer gave a peak in the neighborhood of 1740 cm$^{-1}$ assignable to the carbonyl group ($<$C$=$O) of poly(n-butyl methacrylate).

This result indicates that the copolymer is an AB-type block copolymer composed of the segment (A) which is an ethylene-propylene random copolymer and the segment (B) which is a polymer of n-butyl methacrylate. The ratio of segment (A) to segment (B) in the copolymer was 94/6 (by weight), which was calculated from the yield of the polymer. It was confirmed by the extraction of the copolymer with acetic acid that the hompolymer of n-butyl methacrylate is not present in the copolymer.

EXAMPLE 5

Synthesis of Living EPR

Into a 200-ml flask, with the atmosphere therein completely replaced with nitrogen, was placed toluene as a solvent, and the system was cooled to −78° C. While keeping that temperature, 35 g (0.83 mol) of proylene was added. (It became liquefied and dissolved.) Then there were added a toluene solution containing 0.5 mmol of V(acetylacetonate)$_3$, a toluene solution containing 5 mmol of Al(C$_2$H$_5$)$_2$Cl, and 0.25 mmol of anisole in the order mentioned. Preliminary polymerization was started at −78° C. Half an hour after the preliminary polymerization, nitrogen was evacuated and 1.3 g (46 mmol) of ethylene was introduced. Copolymerization of ethylene and propylene was carried out at −78° C. for 5 minutes under an atmosphere of nitrogen. Thus there was obtained a living EPR.

Synthesis of Iodized EPR

To the above-mentioned polymerization system was added 22 ml of toluene solution containing 0.5 mol/liter of iodine, and the reaction was carried out at −78° C. Thirty minutes later, the reaction solution was introduced into 500 ml of ethanol which had previously been cooled to −78° C., to cause the polymer to separate out. The resulting polymer was washed five times with 500 ml of ethanol and then dried. Thus there was obtained end-iodized EPR.

The resulting iodized EPR was examined for physical properties. The results are shown in Table 1. The NMR analysis of the iodized EPR gave the same chart as FIG.

2. The propylene content calculated from the chart was 50 wt%.

Synthesis of EPR Block Copolymer

In 100 ml of tetrahydrofuran was dissolved 1.25 g of the iodized EPR obtained as mentioned above. The solution was placed in a 300 ml flask, and then 0.05 g of metallic magnesium (for Grignard reaction) was added. Reaction was performed for 5 hours at the refluxing temperature of tetrahydrofuran. There was obtained a grayish green solution.

This solution was cooled to −78° C., and 500 mmol of MMA was added to start reaction. After reaction for 50 hours at −78° C., the reaction liquid was introduced into 500 ml of ethanol kept at −78° C. The polymer was washed five times with 500 ml of ethanol, followed by drying. Thus there was obtained 1.61 g of copolymer. The thus obtained copolymer was analyzed in the same way as in Example 1. The results are shown in Table 1. It was confirmed that the homopolymer of MMA is not present in the copolymer.

EXAMPLES 6 AND 7

Synthesis of Iodized EPR

Two kinds of living EPRs were prepared as in Example 5 under different polymerization conditions. The resulting living EPRs were iodized in the same way as in Example 5 to give iodized EPRs, the properties of which are shown in Table 1.

Synthesis of EPR Block Copolymer

The iozided EPR obtained in the above step was used for copolymerization with MMA in the same way as in Example 5 except that the amount and the polymerization condition were changed as shown in Table 1. There was obtained AB-type EPR block copolymers having the properties as shown in Table 1.

constitutional units represented by the formulas I and II below

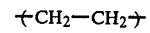   I

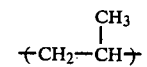   II wherein the amount of I in said segment (A) is from 30 to 80 wt% and the amount of II in said segment (A) is from 70 to 20 wt%, and said polymer segment (B) being composed of the constitutional units represented by the formula

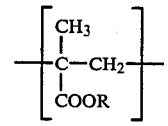

wherein R is hydrocarbyl of from 1 to 20 carbon atoms, said process comprising the steps of:
  (a) performing living polymerization of ethylene and propylene at a temperature of less than −50° C. in the presence of a catalyst comprising (i) a beta-diketone vanadium chelate of the formula

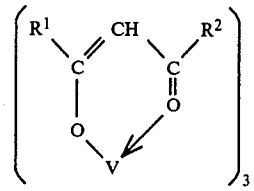

wherein $R^1$ and $R^2$ are the same or different and are

TABLE 1

|  | Example 1 | Example 2 | Example 3 | Example 4 | Example 5 | Example 6 | Example 7 |
|---|---|---|---|---|---|---|---|
| EPR | | | | | | | |
| $\overline{Mn}$ ($\times 10^4$) | 2.72 | 4.30 | 5.77 | 2.91 | 1.01 | 0.75 | 0.75 |
| Mw/Mn | 1.21 | 1.27 | 1.38 | 1.18 | 1.20 | 1.22 | 1.22 |
| Propylene content (wt %) | 50 | 50 | 30 | 50 | 50 | 75 | 75 |
| Amount used (g) | 9.1 | 14.3 | 16.2 | 9.7 | 1.25 | 1.03 | 1.01 |
| Amount of methacrylate ester used (mmol) | 40 | 40 | 50 | 50 | 500 | 200 | 500 |
| Polymerization conditions | | | | | | | |
| Temp. (°C.) | 25 | 25 | 0 | 25 | −78 | −78 | −78 |
| Time (h) | 8 | 5 | 15 | 15 | 50 | 10 | 480 |
| EPR block copolymer | | | | | | | |
| Yield (g) | 10.5 | 15.4 | 17.1 | 10.3 | 1.61 | 1.10 | 4.40 |
| $\overline{Mn}$ ($\times 10^4$) | 2.97 | 4.57 | 6.05 | 3.11 | 1.38 | 0.83 | 4.61 |
| Mw/Mn | 1.17 | 1.24 | 1.41 | 1.20 | 1.23 | 1.18 | 1.20 |
| A/B (wt %) | 87/13 | 93/7 | 95/5 | 94/6 | 78/22 | 94/6 | 23/77 |

Figure 1:
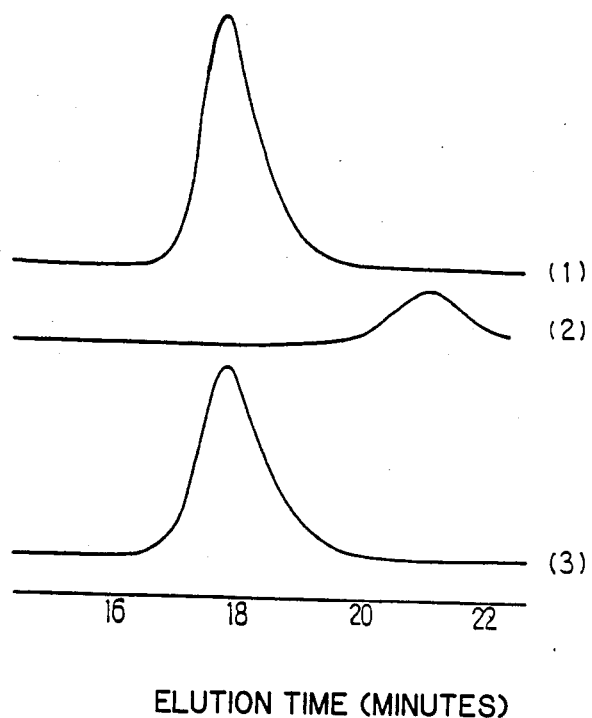
FIG. 1 shows the GPC elution curves of the polymer and copolymer of this invention.
Figure 2:
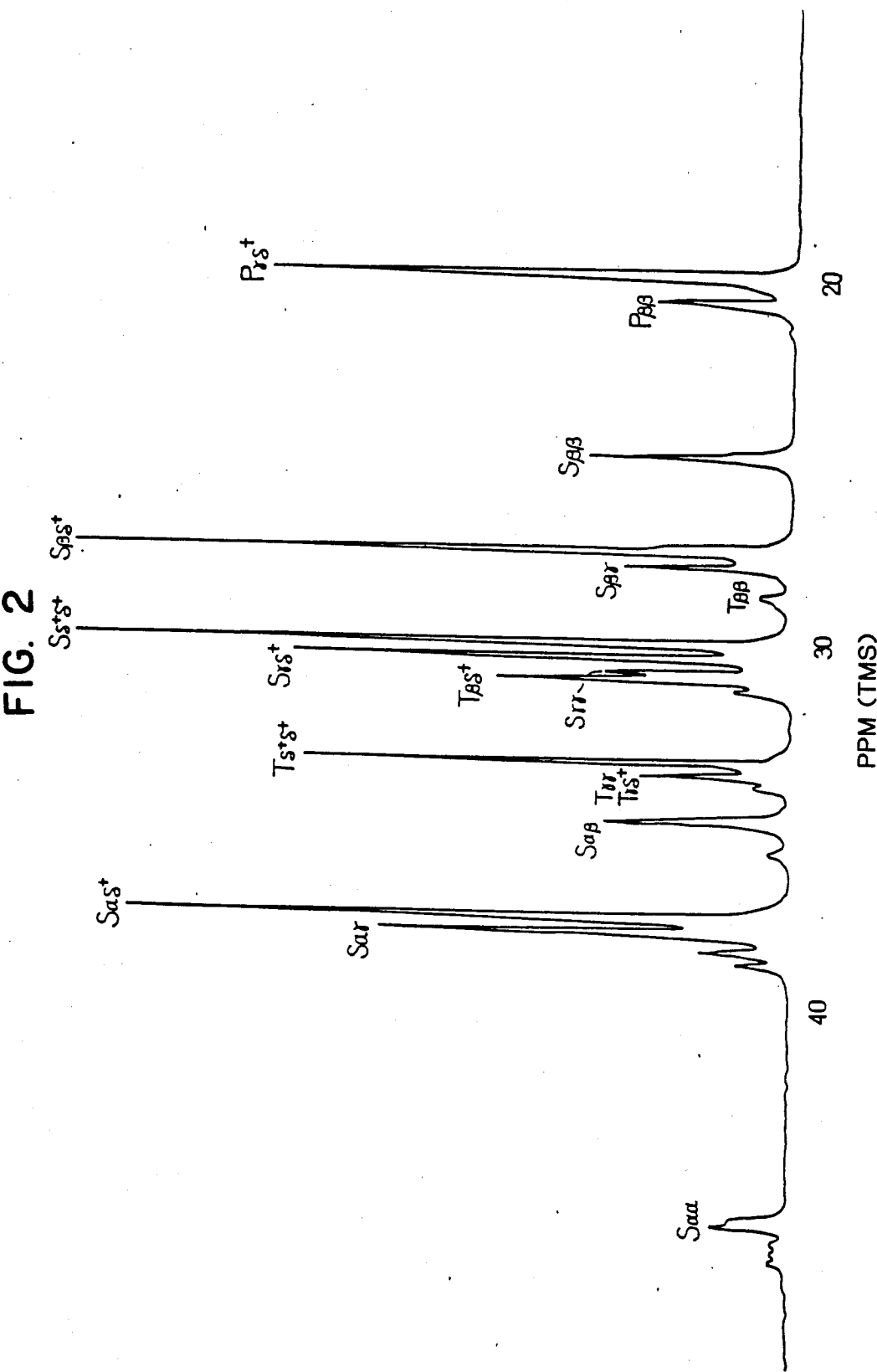
FIG. 2 shows the NMR spectrum of the polymer of this invention.

What is claimed is:

1. A process for producing a block copolymer having a number-average molecular weight of about 1,000 to about 600,000 in which a random copolymer segment (A) is bonded to a polymer segment (B), with the ratio of (A) to (B) being 15/85 to 97/3 by weight, said random copolymer segment (A) being composed of the each alkyl or aryl, and (ii) an organoaluminum compound of the formula $R_2AlX$, wherein R is an alkyl group of 1 to 8 carbon atoms and X is a halogen atom, to provide a living ethylene-propylene random copolymer having an ethylene-to-propylene ratio of from 30/70 to 80/20 by weight, said vanadium chelate being used in an amount of from $1 \times 10^{-4}$ to 0.01 mol per 1 mol of said ethylene and propylene, said organoaluminum compound being used in an amount of from about $1 \times 10^{-3}$ to 0.1 mol per 1 mol of said ethylene and propylene, and said organoaluminum compound being used in an amount of from 5 to 25 mol per 1 mol of said vanadium chelate;
(b) reacting said ethylene-propylene copolymer with a halogen selected from the chlorine, bromine and iodine to provide an ethylene-propylene random copolymer having halogenated terminal groups, said halogen being employed in an amount of from 2 to 5 moles per mole of said organoaluminum compound;
(c) contacting said halogenated copolymer produced in step (b) with metallic magnesium; and
(d) polymerizing the product of step (c) with a methacrylate ester of the formula

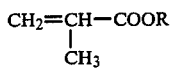

wherein R is as defined above, to form said block copolymer.

2. The process of claim 1 wherein said vanadium chelate comprises a member selected from the group consisting of V(acetylacetonate)$_3$, V(benzoylacetylacetonate)$_3$, and V(dibenzoylmethanate)$_3$.

3. The process of claim 1 wherein said organoaluminum compound comprises a member selected from the group consisting of dimethylaluminum chloride, diethylaluminum chloride, diethylaluminum bromide, and diisobutylaluminum chloride.

4. The process according to claim 1 wherein said step (a) polymerization temperature is at $-65°$ C. or below.

5. The process of claim 1 wherein said halogenated copolymer and said metallic magnesium are contacted in the presence of tetrahydrofuran or diethylether solvent under reflux for 1 to 10 hours and wherein from about 0.001 to 0.1 part by weight of said metallic magnesium is employed per part by weight of said halogenated copolymer.

6. The process according to claim 5 wherein said polymerization step (d) is performed at a temperature of from $-50°$ to $-100°$ C.